UNITED STATES PATENT OFFICE.

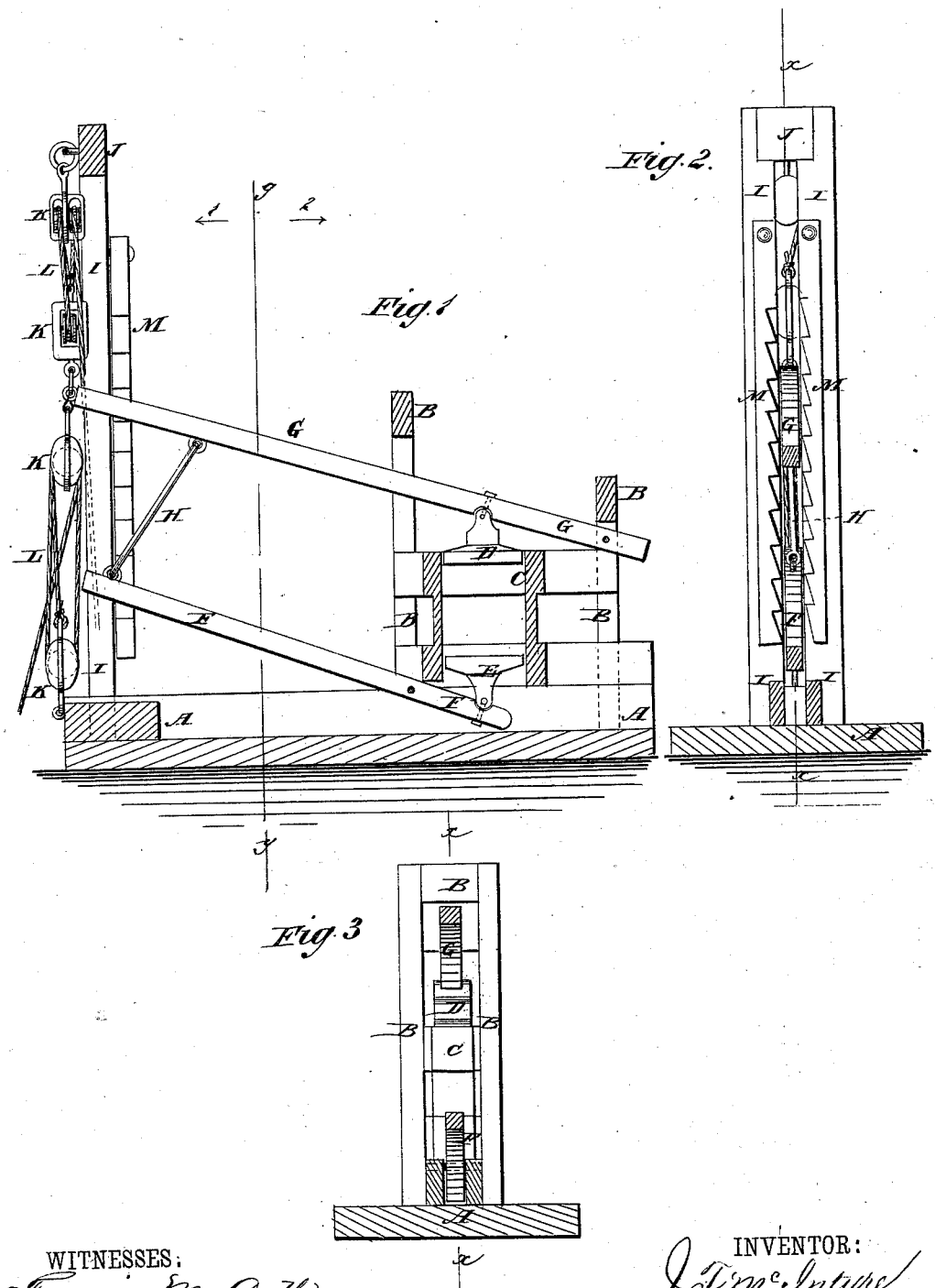

INNES T. McINTYRE, OF CARROLLTON, MISSISSIPPI.

IMPROVEMENT IN BALING-PRESSES.

Specification forming part of Letters Patent No. 216,431, dated June 10, 1879; application filed March 18, 1879.

*To all whom it may concern:*

Be it known that I, INNES THORNTON MC-INTYRE, of Carrollton, in the county of Carroll and State of Mississippi, have invented a new and useful Improvement in Baling-Presses, of which the following is a specification.

Figure 1 is a vertical longitudinal section of my improved baling-press, taken through the line $x\ x$, Figs. 2 and 3. Fig. 2 is a vertical cross-section of the same, taken through the line $y\ y$, Fig. 1, and looking in the direction of arrow 1. Fig. 3 is the same section as Fig. 2, but looking in the direction of arrow 2.

Similar letters of reference indicate corresponding parts.

The object of this invention is to furnish an improved press for baling cotton and other substances, which shall be simple in construction, inexpensive in manufacture, convenient in use, and powerful in operation, compressing the material quickly, and making the bales of uniform size.

The invention consists in the combination of the two pivoted movable followers, the two levers and their connecting-bar, and the two sets of pulley blocks and ropes with the baling-box and the frame-work of the press; and in the combination of the two ratchet-bars pivoted to the guide-uprights with the two levers that operate the two movable followers of the press, as hereinafter fully described.

A represents the base-frame or platform of the press, to which, near one end, is attached the frame B, to which the baling-box C is secured. D E are the followers, both of which are movable.

The lower follower, E, is pivoted to the end of the lever F, which is a lever of the first class, and is pivoted to the lower front part of the press-frame B.

The upper follower, D, is pivoted to the lever G at a little distance from its end. The lever D is a lever of the second class, and is pivoted at its end to the upper rear part of the press-frame B.

The outer parts of the levers F G are connected by a bar, H, the ends of which are pivoted to the said levers. The outer ends of the levers F G move up and down between two parallel uprights, I, the lower ends of which are attached to the base-frame A, and their upper ends are connected by a cross-bar, J. The end of the upper lever, G, projects, and to it are connected two sets of pulley-blocks, K, and ropes L.

The upper set of pulley blocks and ropes K L is connected with the top cross-bar, J, and the lower set is connected with the base-frame A.

With this construction, by drawing upon the upper rope L, the outer ends of the levers G F will be drawn upward, which movement of the said levers moves the followers D E from each other and raises the upper follower, D, out of the baling-box C, so that it can be swung to one side to leave the top of the said baling-box open and allow the cotton to be readily put into it.

When the desired amount of cotton has been put into the baling-box C, the follower D is swung into place, and the lower rope L is drawn upon, drawing the outer ends of the levers G F downward. This movement of the levers G F forces the followers D E toward each other, compressing the cotton into a bale.

To the rear side of the guide-uprights I are pivoted the upper ends of two ratchet-bars, M, one of which is made with upwardly-projecting teeth, and the other with downwardly-projecting teeth, as shown in Fig. 2, so that one or the other of the said ratchet-bars M may be used, according as the levers G F are moving upward or downward.

The ratchet-bars M, when in use, hang with their teeth resting against the sides of the levers G F, so that, should the rope break or be slackened, from any cause, the said levers may be held securely in the position into which they may have been drawn, and may thus be prevented from flying back.

Having thus described my invention, I claim as new and desire to secure by Letters Patent—

1. The combination, in a baling-press, of the movable followers D E, the lever F, pivoted at its end to the follower E and to the lower front part of the press-frame, the lever G, pivoted a short distance from its end to the follower D, and its end pivoted to the upper rear part of the frame, the connecting-bar H, the two sets of pulley blocks and ropes K L, and the pivoted ratchet-bars M with the press-box C and the frame A B I J, substantially as shown and described.

2. The combination of the two ratchet-bars M, pivoted to the uprights I, with the two levers G F, that operate the two followers D E, substantially as herein shown and described.

INNES THORNTON McINTYRE.

Witnesses:
W. B. HELM,
SAML. HART.